(12) United States Patent
Thomson

(10) Patent No.: US 6,350,942 B1
(45) Date of Patent: Feb. 26, 2002

(54) DEVICE, METHOD AND SYSTEM FOR THE VISUALIZATION OF STRINGED INSTRUMENT PLAYING

(75) Inventor: Richard Atwater Thomson, Salt Lake City, UT (US)

(73) Assignee: Philips Electronics North America Corp., New York, NY (US)

( * ) Notice: Subject to any disclaimer, the term of this patent is extended or adjusted under 35 U.S.C. 154(b) by 0 days.

(21) Appl. No.: 09/742,998

(22) Filed: Dec. 20, 2000

(51) Int. Cl.[7] .......................... G09B 15/00; G09B 15/02
(52) U.S. Cl. .................. 84/477 R; 84/600; 84/726; 84/731; 84/485 R
(58) Field of Search .................. 84/600–602, 616, 84/654, 658, 723, 725–726, 730–731, 477 R, 485 R, DIG. 6

(56) References Cited

U.S. PATENT DOCUMENTS

| | | | |
|---|---|---|---|
| 4,653,376 A | 3/1987 | Allured et al. ............... | 84/1.16 |
| 5,038,662 A | 8/1991 | Ho ............................... | 84/723 |
| 5,147,970 A | 9/1992 | Obata ........................... | 84/603 |
| 5,670,729 A * | 9/1997 | Miller et al. .................. | 84/609 |
| 6,124,544 A * | 9/2000 | Alexander et al. ............ | 84/616 |

FOREIGN PATENT DOCUMENTS

| | | | |
|---|---|---|---|
| JP | 129378 | 5/1996 | ............ G10H/1/00 |
| JP | 172254 | 6/2000 | ............ G10H/1/00 |

* cited by examiner

*Primary Examiner*—Marlon Fletcher
(74) *Attorney, Agent, or Firm*—Gregory L. Thorne (57) ABSTRACT

The present invention provides a device, method and system for the visualization of stringed instrument playing. The invention involves measuring a property of one or more strings, and using the property to create or modify a visual display. In one aspect of the invention, a change is measured in a property of a portion of a string of a stringed instrument and a signal is generated in response to the change. The signal can then be used to modify or create a visual display. In another aspect of the invention, a change in a property of each string on a stringed instrument is measured and signals are generated for each change. These signals may be low level signals that are processed to generate one or more high level signals providing, e.g., an overview of how the instrument is being played. The high level signals, low level signals, or both may be used to modify or create a display.

21 Claims, 4 Drawing Sheets

DEVICE, METHOD AND SYSTEM FOR THE VISUALIZATION OF STRINGED INSTRUMENT PLAYING

FIELD OF THE INVENTION

The present invention relates to musical instruments, and more particularly, to a device, method and system for the visualization of stringed instrument playing.

BACKGROUND OF THE INVENTION

Devices exist that attempt to generate visual imagery from stringed instruments. One such device is a spectrum analyzer, which takes sound and breaks the sound into a number of frequency components. The amount of sound in any one section of the frequency spectrum, for instance 20–200 Hertz, will have a value assigned to it. This value corresponds to how much of the total sound occurs in this section.

Once the values of the frequency spectrum are known, they can be used to create visual imagery. Such displays could involve simple bar graphs showing the frequency spectrum and how much sound occurs in each section of the spectrum. Alternatively, there are displays that produce patterns that depend on the frequency spectrum.

Other devices that create visual imagery from sound take a Musical Instrument Digital Interface (MIDI) stream of notes and use the stream to produce visual imagery. MIDI is a standard for digital music.

However, these visual imagery systems can miss information that is not contained within a frequency spectrum or a note stream. For instance, perhaps certain fingers are used on an instrument to create a particular sound. That these fingers are used—and not others—cannot be determined from sound or notes alone.

For stringed instruments, in particular, there are a variety of ways of playing an instrument that do not appear in a frequency spectrum or a note stream. For instance, if a chord is being played, the strings could all be plucked at the same time, strummed singly from top-to-bottom, or strummed singly from bottom-to-top. The spectrum of the chord and the notes making up the chord will generally be the same for all three methods of playing.

For a stringed instrument such as an electric guitar, there are even more ways of playing the guitar that do not appear in these types of visualization devices. For example, the neck of the guitar can be bent, which will decrease or increase tension on the strings. Additionally, a lever (also called a "whammy bar") can be used to dramatically increase or decrease tension on strings. These physical manipulations of the guitar cannot be determined by the current visual imagery systems.

A need therefore exists for techniques that allow manipulations of stringed instruments to be determined and used for generating visual imagery.

SUMMARY OF THE INVENTION

The present invention provides a device, method and system for the visualization of stringed instrument playing. The invention involves measuring a property of one or more strings, and using the property to create or modify a visual display.

In one aspect of the invention, a change is measured in a property of a portion of a string of a stringed instrument and a signal is generated in response to the change. The signal can then be used to modify or create a visual display.

In another aspect of the invention, a change in a property of each string on a stringed instrument is measured and signals are generated for each change. These signals may be low level signals that are processed to generate one or more high level signals providing, e.g., an overview of how the instrument is being played. The high level signals, low level signals, or both may be used to modify or create a display.

A more complete understanding of the present invention, as well as further features and advantages of the present invention, will be obtained by reference to the following detailed description and drawings.

DETAILED DESCRIPTION

Figure 1:
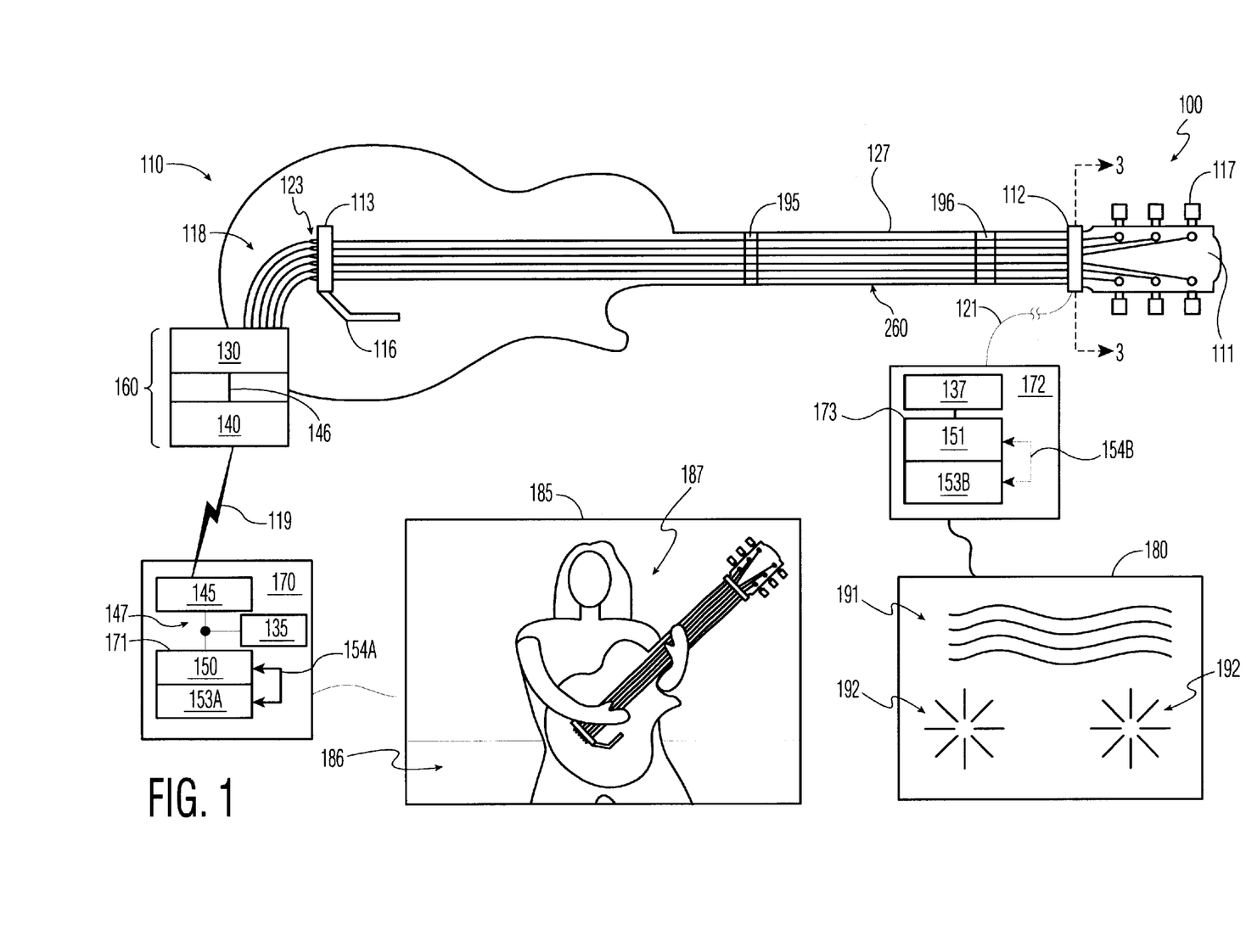
FIG. 1 illustrates a system for visualizing stringed instrument playing in accordance with a preferred embodiment of the invention.

Referring now to FIG. 1, this figure shows a system 100 for the visualization of playing of stringed instruments. In this example, the stringed instrument is an electric guitar 110. However, the present invention may be used with any stringed instrument, such as, e.g., a bass, violin, viola, or cello.

Guitar 110 comprises a tailpiece/bridge assembly 113, a tremolo bar 116 (also called a "whammy bar"), a neck 127, a head 111, and tuning heads 117. System 100 comprises guitar 110 and two preferred embodiments for visualizing the playing of guitar 110.

It should be noted that tailpiece/bridge assembly 113 is integrated and performs the function of both a bridge and a tailpiece. Generally, a tailpiece secures the strings and the strings run over the bridge, usually through some number of grooves. The tailpiece/bridge assembly 113 depicted in FIG. 1 is the type found on, for instance, a FENDER STRATOCASTER or similar guitar. Alternately, the tailpiece and bridge could be separate, as they are on many stringed instruments. In particular, for electric guitars, this is the system used on most GIBSON LES PAUL guitars.

The first embodiment comprises six ball property-measuring structures 123, six wired outputs 118, a transmitting unit 160 comprising a signal generator 130 and a transmitter 140, a personal computer 170 and a video display 185. Personal computer 170 comprises a receiver 145, a memory 135 and a processor 171. Processor 171 comprises a signal analyzer 150 and a visual display processor 153A.

The second embodiment comprises a nut property-measuring structure 112, a group output 121, a stand-alone stringed instrument visualization device 172 and a physical system 180. Stand-alone stringed instrument visualization device 172 comprises a memory 137 coupled to a processor 173 that itself comprises a signal processor 151 and a visual display processor 153B.

The first embodiment will be described in more detail immediately below. The second embodiment will be described after the first embodiment is described.

The personal computer 170 comprises a processor 171 operatively coupled to the memory 135. Memory 135 will configure the processor 171 to implement the methods, steps, and functions disclosed herein. The memory could be distributed or local and the processor could be distributed or singular. The memory could be implemented as an electrical, magnetic or optical memory, or any combination of these or other types of memory. The signal analyzer 150 and visual display processor 153A could be implemented solely in software stored in memory 135, which then configures processor 171 to carry out the appropriate steps, or implemented solely as hardware (such as a very large scale integrated circuit) or implemented as a combination of hardware and software (such as a gate array design that reads configuration information from a programmable read only memory).

Each of the six ball property-measuring structures 123 is preferably directly integrated into a ball of one of the strings 260. In this example, there are six strings 260. Because each string is very similar, the strings will be referred to collectively as strings 260 and singly as a string 260. The ball property-measuring structures 123 contain wired outputs 118, where each wired output 118 may contain one or more individual wires or other devices capable of routing signals. The wired outputs 118 connect to signal generator 130, which produces low level signals 146. Signal generator 130 measures a property of sections of each of the strings 260. For instance, in a preferred embodiment, the measured property for each string is an axial strain, a tensile stress, or an axial force. As is known in the art, stress is force divided by area. Any device that can measure force or stress may be used in the present invention. As is also known in the art, strain is an elongation of a specimen divided by the initial length of the specimen. Any device suitable for measuring strain may be used with the present invention. Preferably, a strain gauge will be used to measure strain, as discussed in reference to FIGS. 2 through 4. As is known in the art, within certain limits, stress and strain are related. Within these limits, stress is equal to the modulus of elasticity multiplied by the strain.

Signal generator 130 preferably contains any necessary circuitry to determine the property being measured. For instance, if strain is being measured, the signal generator 130 will preferably contain a Wheatstone bridge, DC power supply, amplification equipment, and other devices to adequately measure the strain. Force, stress, and strain measurements are well known to those skilled in the art. Exemplary strain gauges suitable for use with the present invention are available from the Measurements Group, Incorporated, P.O. Box 27777, Raleigh, N.C., 27611.

While signal generator 130 measures a property of sections of each of the strings 260, it produces low level signals 146. Low level signals 146 are interpretations of a property on each of the strings 260. Low level signals 146 will contain some indication of the property being measured, and may be analog or digital representations thereof.

For instance, if strain is being measured, the strain on each string can be determined in inches/inches (a unitless measurement) or meters/meters (also a unitless measurement). If a strain gauge is being used, the resistance of the strain gauge will be proportional to the strain. A Wheatstone bridge may be used to determine this resistance by measuring an output voltage that is proportional to the resistance. The low level signals 146 could contain this strain data in digital form by having the signal generator 130 periodically sample the output voltage and convert this to a digital version of a strain measurement. By "periodically," it is meant that the voltage would be sampled regularly, at the end of each period of time that passed. Alternatively, the voltage can be directly output as an analog low level signal 146 that is proportional to the strain, or another signal may be output as low level signal 146 that is proportional to the strain.

Similarly, if force is being measured, the low level signals 146 could be digital indications of the amount of force in pound-feet or Pascals, or analog signals proportional to the amount of force. If stress is being measured, the low level signals can be digital indications of the amount of stress in units of pound-feet per square inch or Pascals per square meter, or can be analog signals proportional to the amount of stress.

Timing information may also be included in low level signals 146, if desired. If signal generator 130 is producing digital samples, which are taken on a periodic basis, this would lessen the need for timing information.

Signal generator 130 is preferably part of the transmitting unit 160. Transmitting unit 160 also comprises Radio Frequency (RF) transmitter 140. Low level signals 146 are coupled to transmitter 140 and sent through RF transmission channel 119 to RF receiver 145. RF transmitter 140 can digitally sample low level signals 146 and transmit the samples to RF receiver 145. Such transmission could include packaging the samples into packets, adding modulation to the samples, spreading the information, or other known RF transmission techniques. RF transmitter 140 can also transmit analog low frequency signals, as is known to those skilled in the art.

RF receiver 145 preferably comprises a board or card that may be placed in a slot in a computer, such as personal computer system 170. Consequently, the board may be designed to support the Peripheral Component Interconnect (PCI) standard, or any other standard that allows the RF receiver 145 to communicate with a computer. For instance, RF receiver 145 could be separate from personal computer 170 and connected to personal computer 170 through a parallel port, serial port, or universal serial bus port.

RF receiver 145 receives the transmitted signal on RF channel 119 and recreates the low level signals 146 as received low level signals 147. Such reception could include breaking packets into samples, removing modulation, de-spreading the information, or any other known RF reception technique. If digital low level signals 146 were sent, received low level signals 147 will ideally be exact duplicates of low level signals 146. However, there could be reception errors caused by multipath interference, noise, or other deleterious RF effects. If analog signals 146 were sent, RF receiver 145 will usually digitally sample these signals and convert them into a form suitable for transmission over a computer bus. For example, if the low level signals 146 were voltages that correspond to strains, the RF receiver 145 could reconstruct the voltages, sample the voltages, convert the samples to strain measurements, and package the samples as a suitable sequence of bits that can be communicated over a bus of a personal computer.

RF receiver 145 communicates the received low level signals 147 to signal analyzer 150, generally through the use of interrupts and a system bus. Signal analyzer 150 analyzes the received low level signals to create high level signals that are packaged as scripts 154A. The high level signals are a more general indication as to what is happening to the guitar 110. For instance, the present invention may be able to tell what chords are being played, as the property being measured should change when guitar strings are pressed at particular locations. For example, if the top string is pressed at location 195, there should be a change in the property from its initial value, when the string is not pressed at all, to a different value when the string is pressed at location 195. This change in the property should be different than when the top string is pressed at location 196. Such information, if compiled for each string, could indicate which chord was being played. The high level signal could indicate this.

The high level signal could also indicate if the strings are being strummed from top-to-bottom, from bottom-to-top, all at once, or picked in a particular order. To determine this, the signal analyzer 150 will likely have to keep a small record of the property for each string. For example, the signal analyzer 150 should be able to determine when the string is held down, because the property will change from a "steady state" value, which occurs when the string is in its normal position, to a "pressed down" value that occurs when the string is pressed down. When a chord or a note is played, the string will be struck or plucked. During the strike or pluck, the property will change from its "pressed down" value to a "struck" value. After the strike or pluck, the property will change from the "struck" value to the "pressed down" value again. The signal analyzer should hold the "pressed down" value so that it can determine that the string has been struck. Moreover, it might be beneficial to hold both the "pressed down" and the "struck" values of the property. This will allow the signal analyzer 150 to determine the progression from "pressed down" to "struck" and back to "pressed down." Thus, the high level signals could indicate how the strings are struck.

This technique may also determine how much force is being used to play the stringed instrument. For example, if a chord is struck really hard, the "struck" values for each string should be different than the "struck" values that occur when the chord is lightly struck. This force could be quantified and included as part of the high level signals.

The high level signals could also include information on whether and potentially how much the tremolo bar 116 is used. When using the tremolo bar 116, a person will normally hold a chord or note and then pull or push the tremolo bar 116. The signal analyzer 150 should determine that the strings are at some "pressed down" or "steady state" value, that the property increases or decreases (depending on how the tremolo bar 116 is used), and that the strings return to the original "pressed down" or "steady state" value. Therefore, the high level signals could indicate that the tremolo bar 116 was used and even give some indication as to how much the tone changed.

A similar effect to that caused by the tremolo bar 116 is caused by bending neck 127. If the neck 127 is bent toward or away from strings 260, the strings will be shortened or lengthened, respectively. It should be noted that the bending of a guitar neck will be a relatively small excursion, as necks are generally quite rigid. The signal analyzer 150 should be able to determine this through similar methods as discussed for the use of the tremolo bar 116. Generally, this effect is much less severe than that caused by the tremolo bar 116, and the two effects should be able to be independently determined by the signal analyzer 150. Therefore, the high level signals could indicate bending of the neck.

The high level signals may also be able to contain information as to how long a pick, finger(s), bow, or other device stayed on a string. This length-of-contact information may be presented in the high level signals.

The high level signals can also include information as to how long strings are pressed. This can help to determine chords or notes that are struck once but then, through feedback or other devices, are sustained for a long time. The high level signals can additionally include information such as if a slide is being used on the guitar 110.

Thus, the high level signals preferably contain broad descriptions of what is occurring to the guitar. These signals may additionally include timing information, such as how long strings are pressed down, how long chords are held, or the time between when a string is pressed down and when the string is first struck. Additional timing information has previously been discussed.

The signal analyzer 150 will preferably "package" the high level signals as scripts 154A. A script will usually be written in some form of programming language. As such, a script could be an object with a defined interface or a data structure. A script could also be prepared interactively in an authoring tool. This could be similar to the way that SHOCKWAVE (a device allowing certain manipulations of visual images) or POWERPOINT (a program for creating presentations) animations are created today, or it could be more sophisticated, e.g., like the MAYA (made by Alias-Wavefront) animation system. A script will be some predetermined form that allows visual display processor 153A to determine and use the information. Additionally, the script might have received low level signals 147 packaged along with the high level signal interpretations thereof.

An example script could be a data structure having one or more elements for storing high level signals, one or more elements for storing timing information related to the high level signals, and a number of elements for storing received low level signals 147. This could be passed to visual display processor 153A and manipulated in any manner.

Visual display processor 153A will use the scripts and create a visual display through interpreting the scripts. In the example of the first embodiment of FIG. 1, the visual display is being shown on a video display 185. Generally, the visual display processor 153A will create dynamic designs that overlay static designs. The static designs will generally not change, however, they could be motifs that periodically change. For instance, the static designs could be part of a preprogrammed animated loop. The motifs creating the static designs could periodically change. The dynamic designs are influenced by the information in the scripts. The dynamic designs are preferably layered on top of the static designs.

For example, video display 185 shows an animated background 186 that is a static design, and an animated performer 187 that is a dynamic design. The animated performer can be programmed to perform movements that coincide with the high and/or low level signals in the scripts. This could be useful when teaching a song, when creating an animated sequence for a music video, or when correlating the song, as part of a sound track, to a scene in a movie.

It is not necessary that the dynamic designs be related in any way to a particular performer. In addition, the static designs could be completely arbitrary. Preferably, the visual display created on video display 185 will be created by an end-user. The end-user can create any type of visual display. The end-user preferably uses the visual display processor 153A to program the visual display. The scripts help in this regard because, through the use of visual display processor 153A, they can be manipulated by an end-user.

Thus, the present invention can determine manipulations of a stringed implement that are not able to be determined by traditional techniques. The present invention may be used to add visual imagery that corresponds to the physical manipulations of the instrument.

It should be noted that the various elements of this embodiment do not have to be structured as shown in FIG. 1. Consequently, the signal analyzer 150 and visual display processor 153A could be combined into one program that performs the function of both. Additionally, the signal analyzer 150 could be added to the transmitting unit 160 and scripts could be transmitted through the transmitter 140, through the receiver 145, and to the visual display processor 153A. In the latter embodiment, the signal analyzer 150 and the signal generator 130 could be combined.

Moreover, it should be noted that traditional techniques can be added to the present invention to further improve the amount of data about stringed instrument playing. For example, frequency analysis could be used and added to the scripts 154A to further refine what is happening to the stringed instrument.

As previously discussed, the second embodiment depicted in FIG. 1 comprises a nut property-measuring structure 112, a group output 121, a stand-alone stringed instrument visualization device 172 and a physical system 180. Stand-alone stringed instrument visualization device 172 comprises a memory 173 that itself comprises a signal processor 151 and a visual display processor 153B. Because many of the elements in the second embodiment are common to the first embodiment, only the differences between the two embodiments will be discussed.

In the second preferred embodiment of FIG. 1, the nut property-measuring structure 112 measures a property of a section of each of the strings 260. An exemplary nut property measuring structure 112 will be discussed in reference to FIG. 3. The necessary signals to determine a property are bundled into one group output 121, which will generally comprise a number of bundled wires. These are inputs to stand-alone string instrument visualization device 172. As previously noted, stand-alone string instrument visualization device 172 comprises a memory 137, which can be distributed or local. If stand-alone string instrument visualization device 172 is a computer, there will be a processor 173 coupled to the memory 137. Processor 173, in this example, comprises signal processor 151 and visual display processor 153B.

The inputs to stand-alone string instrument visualization device 172 are coupled to signal processor 151. Signal processor 151 combines the functionality previously described as being performed by the signal generator 130 and the signal analyzer 150. The signal processor 151 produces scripts 154B.

In this embodiment, a benefit is that the system is self contained. However, a potential disadvantage is that group output 121 is coupled to the stand-alone string instrument visualization device 172. This means that the performer using guitar 110 will not be able to roam as much. In this example, there is a physical system 180. Physical system 180 is a stage that contains a static design 191 and a dynamic design 192. The stage may also contain a video display (not shown). A "physical system" is an area in which people can congregate to view the visual display. Such areas could include, for instance, an auditorium or playhouse. As noted above, a video display may be used as part of the physical system. This would add an additional level to the visual display.

In this example, the dynamic designs 192 may be pyrotechnics timed to certain scripts and/or flashing and colored lights. Dynamic design 192 can comprise further designs such as motifs, laser light patterns, or moving stage elements.

Thus, the present invention can be used to create a visual display for a live performance.

It should be noted that elements of both of these preferred embodiments may, but need not, be combined. For example, the group output 121 can be routed from the nut property-measuring structure 112 to the signal generator 130. This will provide two different "views" of the same string, which may aid in determining where the string is being pressed in relation to the neck 127. Additionally, computer system 170 could be coupled to physical system 180, and stand-alone string instrument visualization device 172 may be coupled to video display 185. The depiction shown in FIG. 1 merely shows examples of possible configurations.

As is known in the art, the methods and apparatus discussed herein may be distributed as an article of manufacture that itself comprises a computer readable medium having computer readable code means embodied thereon. The computer readable program code means is operable, in conjunction with a computer system such as computer system 170 or 172, to carry out all or some of the steps to perform the methods or create the apparatus discussed herein. The computer readable medium may be a recordable medium (e.g., floppy disks, hard drives, compact disks, or memory cards), or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Figure 2:
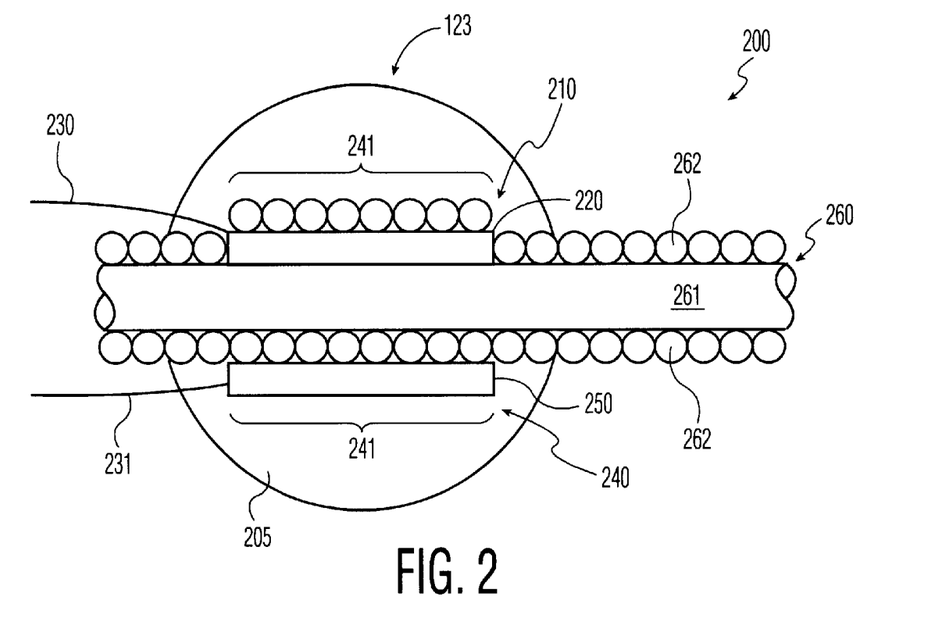
FIG. 2 illustrates a device for measuring a property of a string in accordance with a preferred embodiment of the invention.

Referring now to FIG. 2, a system 200 for measuring a property of a string is shown. System 200 comprises a string 260 having an inner section 261, of generally solid metal, and an wound outer section 262. Formed around string 260 is a ball 205, usually formed of metal and pressed onto the string 260. It should be noted that "ball" is a common term for this structure, which basically holds the string at one end of its length. However, the ball itself may be shaped in other configurations, such as cylindrically. FIG. 2 shows two preferred property-measuring devices 210 and 240. Generally, only one property-measuring device 210 or 240 would be used at one time. Property-measuring device 210 comprises a strain gauge 220 that is placed on an outer surface of the inner section 261 and between the inner section 261 and under the wound outer section 262. Strain gauge 220 is coupled to an output 230. Property-measuring device 240 comprises a strain gauge 250 that is in contact with wound outer section 262. Strain gauge 250 is coupled to an output 231. Outputs 230 and 231 would comprise part of wired outputs 118 of FIG. 1. Section 241 is a portion of the string 260 that has its property being measured by property-measuring devices 210 and 240.

As previously discussed, a strain gauge can determine a change in the length of a body by a corresponding change in resistance. Generally, an adhesive will be used between the strain gauge and the surface it will be measuring. For instance, a cyanoacrylate or epoxy could be used between strain gauge 210 and the outer surface of the inner section 261. Similarly, an adhesive may also be used between strain gauge 250 and the outer surface of wound outer section 262. However, because the ball 205 may be formed about the stain gauges 250 and 220, it may be possible not to use adhesives.

Strain gauge 220 should be able to determine any lengthening of the inner section 260 along an axis parallel to the string 260. Strain gauge 220 may be attached to the inner section 261 prior to wrapping the wound outer section 262. This would likely require at least some adhesive so that the strain gauge 220 would stick to the outer surface of the inner section 261. Strain gauge 250 should also be able to determine any lengthening of the wound outer section 262 along an axis parallel to the string 260. However, there may also be a lengthening of the wound outer section 262 perpendicular to the string 260. Should this lengthening be significant, it is possible to use a strain gauge that can determine length changes in more than one direction.

It should be noted that some types of string do not contain wound outer surface 262, and some types of string are not made of metal. In the latter instance, the property-measuring device may still be attached to the outer surface of the string and still should be able to measure length changes of the string, if a strain gauge is used. It should also be noted that other locations along the string length may be chosen to hold property-measuring devices 210 and 240. Basically, any section of the string may contain these devices, but putting the devices into the ball or, as discussed in reference to FIG. 3, near the nut will allow these devices to remain out of the area of the string that will be played.

Property-measuring devices 210 and 240 can measure any property or change in a property that involves string forces, tensions, or stresses.

Figure 3:
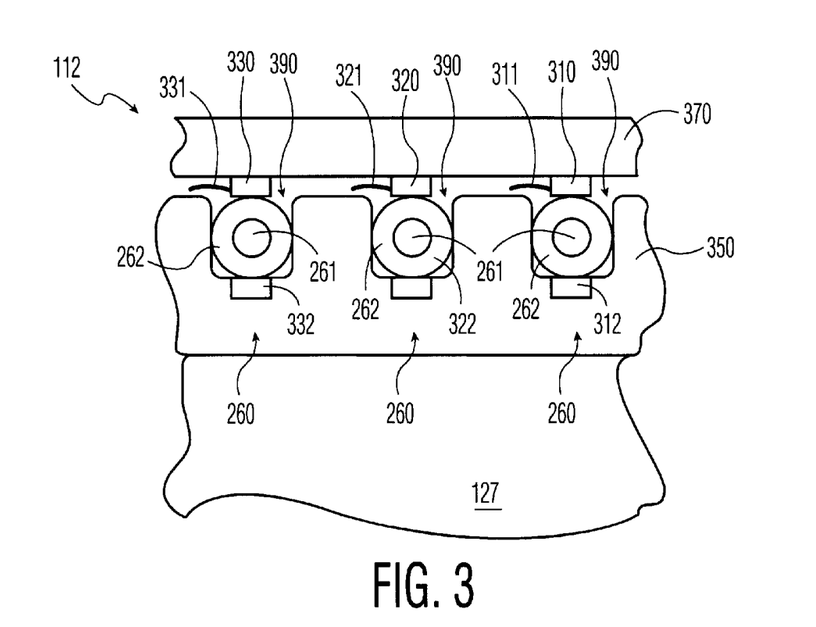
FIG. 3 shows a device for measuring a property of a number of strings in accordance with a preferred embodiment of the invention.

Referring now to FIG. 3, this figure shows a nut property-measuring structure 112 connected to a nut 350 of guitar 110. As is known in the art, strings 260 pass through trenches 390 in nut 350. Nut property-measuring structure 112 comprises a body 370 and three (of six) property-measuring devices 310, 320, and 330. Property-measuring devices 310, 320, and 330 are preferably strain gauges. Each property-measuring device 310, 320, and 330 comprises a lead (or leads) 311, 321, and 331 that will become part of group output 121. Property-measuring devices 310, 320, and 330 are attached to body 370 through any method known to those skilled in the art, such as screws, adhesive, or staples. A coating of adhesive may be used between property-measuring devices 310, 320, and 330 and their respective strings. This adhesive should be removed and refreshed if one or more strings 260 are replaced.

It is preferred that body 370 be able to attach to neck 127 through non-destructive means, such as through clamping. This will allow the nut property-measuring device 112 to be removed and installed without injury to the guitar.

Another embodiment is also shown in FIG. 3. In this embodiment, the property-measuring devices 312, 322, and 332 are built directly into nut 350. This embodiment makes it easier for players to add strings. However, the nut has to be modified to accept the property-measuring devices 312, 322, and 332.

Figure 4:
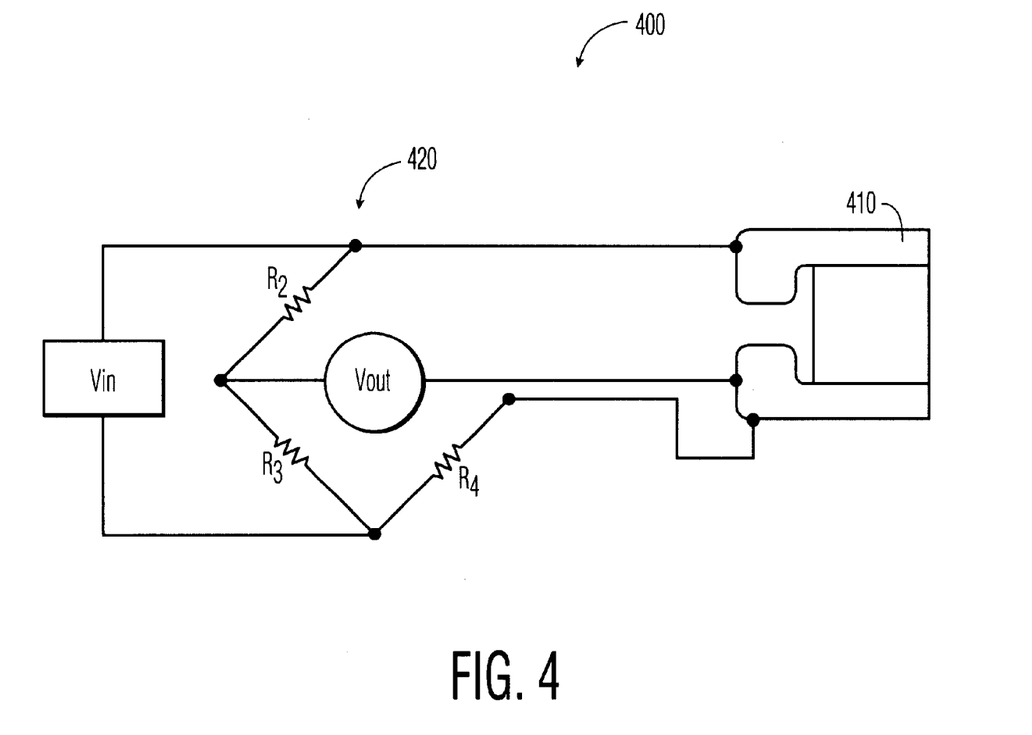
FIG. 4 shows a Wheatstone bridge used to convert a change in resistance to a voltage in accordance with a preferred embodiment of the invention.

Turning now to FIG. 4, this figure shows a voltage-measuring device 400 that could be part of signal generator 130 or signal processor 151 (see FIG. 1) and used in measuring strain. This voltage-measuring device 400 comprises a Wheatstone bridge 420 having resistors $R_2$, $R_3$, and $R_4$, a voltage input, a voltage output, and a strain gauge 410. The voltage out of the device 400 will be proportional to the resistance of the strain gauge 410, which will itself be proportionate to the strain. A change in the resistance indicates a change in length of the strain gauge. With additional circuitry, known to those skilled in the art, the strain may be determined.

Figure 5:
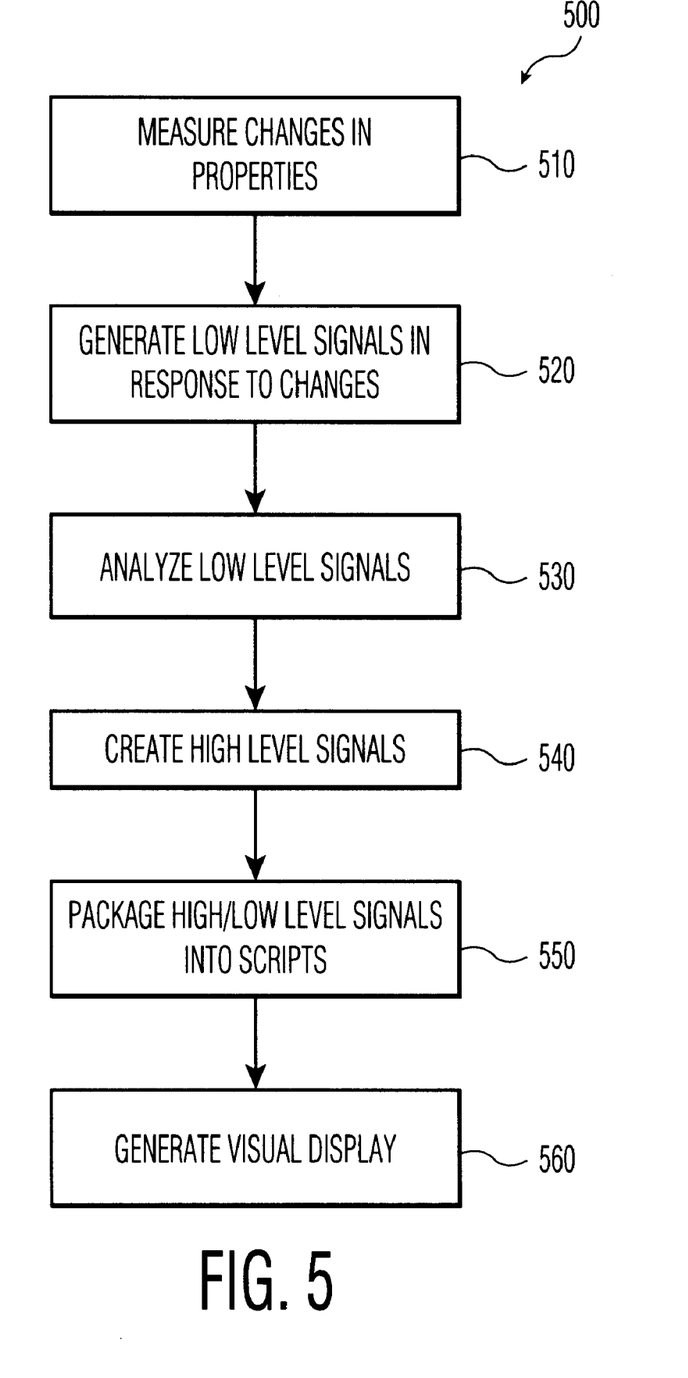
FIG. 5 shows a flow diagram of a method for the visualization of stringed instrument playing in accordance with a preferred embodiment of the invention.

Referring now to FIG. 5, this figure shows a flow diagram of a method 500 for the visualization of stringed instrument playing in accordance with a preferred embodiment of the invention. Method 500 will be performed whenever it is desired to use physical information about how a guitar is being played to generate a visual display.

Method 500 begins when a change in a property of a section of string is measured. Generally, several strings will be measured at once. This occurs in step 510. The change in property could be a force, stress or strain along any of several axes. In step 520, one or more low level signals are generated in response to the change. Such low level signals have already been discussed. These could be voltage differences that are related to a change in strain, force or stress. Alternatively, they could be voltage, current or analog or digital outputs that are indicative of a change in a property. They could include time information, such as when a transition occurred, when the sample was taken, or other timing analysis.

In step 530, the low level signals are analyzed. The low level signals are analyzed so that high level signals may be created (step 540). High level signals are a more general indication of what is happening to the guitar. Consequently, these may include indications of what chord is being played, how hard the strings are being hit, bent, struck, or plucked, whether the tremolo bar is being used, or whether a slide is being used. To create the high level signals, the low level signals should be analyzed for information such as timing for single strings and all strings, forces/strains/stresses on each string, how the current property compares to past properties, and the characteristics of the last high level signal.

Once the high level signals are created, they may be packaged into scripts (step 550) to allow a program on a computer system to interact with them. The program should contain some indication as to what the script is (such as "the tremolo bar is being used") and the designer can then design a visual display to correspond to the scripts (step 560). The visual display may also contain pre-defined motifs or graphical design that are played for certain scripts. For instance, a certain motif may be played if the tremolo bar is used. Similarly, cannons could fire if the strings are played with a large amount of force.

Thus, what has been shown are devices and methods for measuring properties of strings on a stringed instrument and for generating signals and visual displays in response to those properties.

It is to be understood that the embodiments and variations shown and described herein are merely illustrative of the principles of this invention and that various modifications may be implemented by those skilled in the art without departing from the scope and spirit of the invention. For example, different property-measuring devices may be used, or the low or high level signals may be stored for use at a later date. Additionally, the property-measuring devices could be built into the tailpiece, bridge or other existing element of a stringed instrument.

What is claimed is:

1. A method comprising the steps of:
   measuring a change in a property of at least a portion of at least one string of a stringed instrument;
   generating at least one signal in response to the change; and
   generating a visual display in response to the at least one signal, wherein the step of measuring comprises the step of measuring a strain on the at least a portion of the at least one string and wherein the step of generating at least one signal in response to the change comprises the step of generating a voltage for each of the at least one strings that is proportional to a resistance that is proportional to the strain.

2. The method of claim 1, wherein the step of measuring further comprises the step of measuring a force, tensile stress or strain along at least one axis on the at least a portion of the at least one string.

3. The method of claim 1, wherein the step of generating a visual display in response to the signal further comprises the step of generating a visual display on a monitor in response to the signal.

4. The method of claim 1, wherein the step of generating a visual display in response to the at least one signal further comprises the step of generating a visual display on a physical system in response to the at least one signal.

5. The method of claim 1, wherein the step of generating a visual display in response to the at least one signal further comprises the step of generating a visual display on a video display in response to the at least one signal.

6. The method of claim 1, wherein the step of generating a visual display in response to the at least one signal further comprises the step of generating dynamic and static portions of the visual display, wherein the dynamic portions vary in response to the at least one signal.

7. The method of claim 1 wherein:
the step of measuring a change in a property of at least a portion of at least one string of a stringed instrument comprises the step of measuring the change in the property of at least a portion of a plurality of strings of a stringed instrument;
the step of generating at least one signal in response to the change comprises the step of generating a plurality of signals in response to the change, one signal for each of the plurality of strings; and
the step of generating a visual display in response to the at least one signal comprises the step of generating a visual display in response to the plurality of signals.

8. The method of claim 7 further comprising the step of analyzing the plurality of signals to determine high level signals, and wherein the step of the step of generating a visual display in response to the plurality of signals further comprises the step of generating a visual display in response to the high level signals.

9. The method of claim 8 further comprising the step of packaging the plurality of signals into a script comprising the high level signals, and wherein the step of generating a visual display in response to the high level signals further comprises the step of generating a visual display in response to the high level signals.

10. A system for the visualization of string instrument playing, comprising:
a plurality of property-measuring devices, each property-measuring device measuring a strain on a section of one of a plurality of strings; and
a signal generator coupled to each of the plurality of property-measuring devices, the signal generator producing a voltage for each of the plurality of strings that is proportional to a resistance that is proportional to the strain.

11. The system of claim 10 further comprising a signal analyzer coupled to the signal generator, the signal analyzer producing at least one output.

12. The system of claim 11 further comprising a display generator, the display generator interpreting the at least one output and changing a visual display in response to the interpretation.

13. A device comprising:
a string suitable for use on a stringed instrument; and
a property-measuring device attached to the string, the property-measuring device adapted to measure a strain on the string and generate a voltage that is proportional to a resistance that is proportional to the strain.

14. The device of claim 13, wherein the property-measuring device is a means for measuring a change in the strain of a section of the string.

15. The device of claim 13, wherein the property-measuring device comprises a stain gauge.

16. The device of claim 13, wherein the string comprises an inner section and a wound outer section, and where the property-measuring device is attached to an outer surface of the wound outer section.

17. The device of claim 13, wherein the string comprises an inner section and a wound outer section, and where the property-measuring device is attached to an outer surface of the inner section and lies between the inner and wound outer sections.

18. A system comprising:
a memory that stores computer-readable code; and
a processor operatively coupled to the memory, the processor configured to implement the computer-readable code, the computer-readable code configured to:
generate a signal in response to a change in a strain on a section of a string of a stringed instrument
generate a voltage in response to the change that is proportional to a resistance that is proportional to the strain; and
generate a visual display in response to the signal.

19. The system of claim 18 wherein the computer readable code is further configured to measure the change in the strain.

20. An article of manufacture comprising:
a computer readable medium having computer readable code means embodied thereon, said computer readable program code means comprising:
a step to generate a voltage in response to a change in a strain on a section of a string of a stringed instrument;
a step to generate a voltage in response to the change that is proportional to a resistance that is proportional to the strain; and
a step to generate a visual display in response to the signal.

21. The article of manufacture of claim 20 wherein the computer readable code means further comprises a step to measure the change in the strain.

* * * * *